(No Model.)

A. E. BRUCE.
HAND THRASHING MACHINE.

No. 315,710. Patented Apr. 14, 1885.

Witnesses
Jas. E. Hutchinson
Amos E. Smith

Inventor
Alonzo E. Bruce
by T. A. Curtis
Atty.

UNITED STATES PATENT OFFICE.

ALONZO E. BRUCE, OF SPRINGFIELD, MASSACHUSETTS.

HAND THRASHING-MACHINE.

SPECIFICATION forming part of Letters Patent No. 315,710, dated April 14, 1885.

Application filed January 17, 1884. (No model.)

*To all whom it may concern:*

Be it known that I, ALONZO E. BRUCE, of Springfield, in the county of Hampden and State of Massachusetts, have invented new and useful Improvements in Hand Thrashing-Machines, of which the following is a full and complete description.

Figure 1:
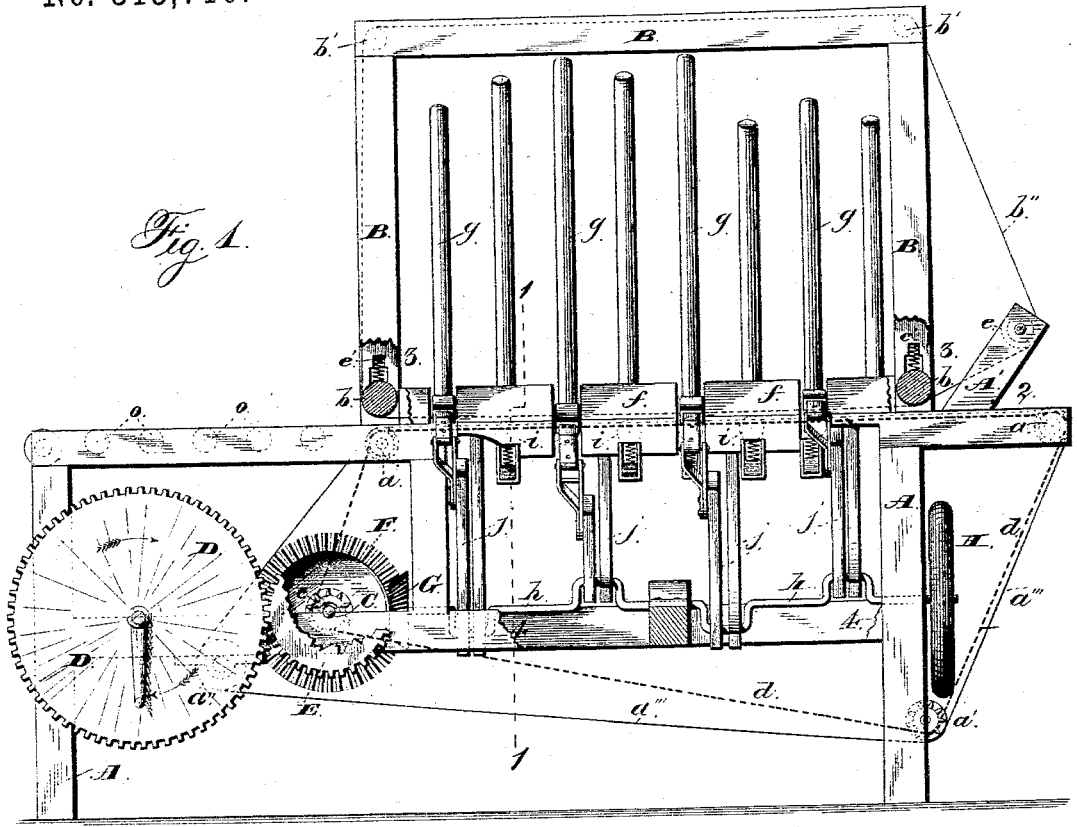
Figure 2:
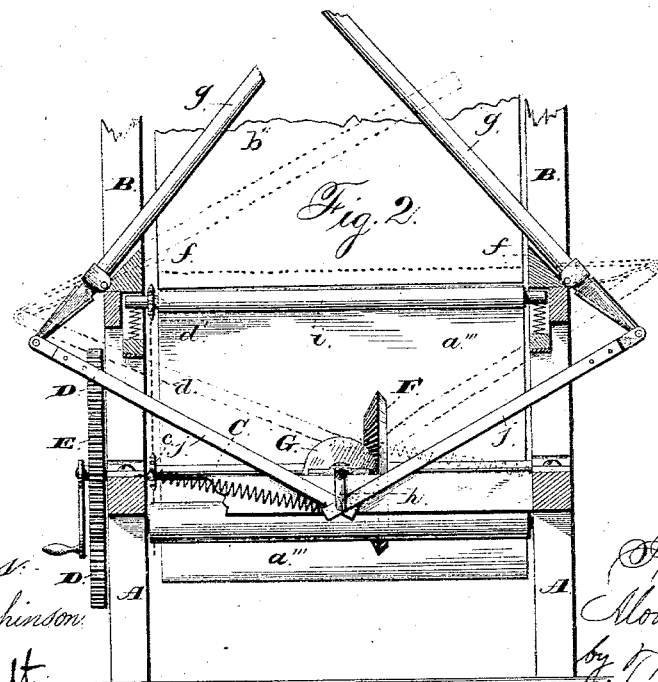

In the accompanying drawings, which form a part of this specification, Figure 1 is a side elevation of my machine, parts of the frame being broken away to show more clearly the arrangement and operation of some of the parts; and Fig. 2 is a vertical cross-section on the line 1 1.

The object of my invention is to provide a machine for thrashing small grain—such as wheat, rye, oats, &c.—by pounding or beating after the manner of the hand-flail.

The straw and grain in the operation of thrashing are fed through the machine between two endless aprons, one of which passes around a series of drums or rollers supported by an upper frame-work, and the other around a series of drums or rollers supported in the main frame. The lower apron is driven by means of a belt or chain passing over a pulley or sprocket wheel on the driving-shaft, and over the drums or rollers around which it moves.

Referring now particularly to the drawings for a detailed description of my invention, A indicates the main frame of the machine, and B an upper frame which supports the rollers $b\ b\ b'\ b'$, around which the upper apron, $b''$, passes. In the lower frame is a series of drums or rollers, $a\ a\ a'\ a''$, around which the lower apron, $a'''$, passes. Passing also around the drums $a\ a\ a'$ and around a pulley or sprocket wheel, $c$, on the driving-shaft C, is an endless belt or chain, (I prefer the latter,) $d$, which is driven by the main shaft, and which imparts motion to the lower apron, $a'''$. The rollers or drums $a\ a$, over which the chain passes, are also provided at or near their ends with sprocket-wheels, as shown at $d'$ in Fig. 2, to insure greater certainty of action. The drums $b\ b$, around which the upper apron, $b'$, passes, may also be driven from the main shaft, if desired, or they may be belted or geared with the drums $a\ a$. Ordinarily, however, the friction of the straw and grain as they pass through the machine will be sufficient to carry along the upper apron. The upper apron passes also around a drum or roller, $e$, supported in standards A', as shown in Fig. 1, the purpose of which is to hold said apron in such a position as to form a feeding-space, 2, for the convenient feeding of the grain into the machine.

The drums $b\ b$ are spring-seated, as shown at $e'$, Fig. 1, to permit them to yield against the pressure of the material passing through the machine. Guards $f f$ are arranged at the sides of the machine to prevent the grain or straw from working out from between the aprons. The bed of the machine over which the aprons $a'''$ and $b''$ pass is composed of a series of rollers, $i\ i$, (shown in dotted lines in Fig. 1,) journaled in the main frame A, the journals being cushioned, for a purpose to be hereinafter explained.

Hinged to the frame A at each side of the machine is a series of beaters or flails, $g\ g$, which are actuated by a crank-shaft, $h$, running lengthwise of the machine and driven from the main shaft C by suitable gearing, as shown, the beaters being arranged directly over the rollers $i\ i$. The outer ends of the beaters are connected with the crank-shaft by pitmen $j\ j$, so that as the shaft is rotated a beating motion will be imparted to their inner ends, causing them to strike the bed of the machine at each downward movement.

The cranks to which the pitmen are connected radiate from the shaft $h$ in different directions, so as to operate the beaters successively or alternately. Two beaters are connected with each crank, one on each side of the machine, and the action of each pair of beaters is therefore also alternate, one going up as the other comes down.

As above stated, the rollers $i\ i$ are cushioned, and the purpose of this is to allow them to yield under the strokes of the beaters, which is important in case of any inequality or irregularity in the material operated upon.

The driving-gear consists of a spur-gear, D, journaled in the frame of the machine at one side, and which meshes with a smaller gear-wheel, E, on the main or driving shaft C, the gear E being broken away in Fig. 1 to show more clearly the mechanism beyond. On the main shaft C is also a bevel-gear, F, which meshes with a smaller bevel-gear, G, on the crank-shaft $h$. The wheel D is provided with a crank or pin by which to turn it.

The operation of the mechanism described is as follows: The wheel D being turned, rotation is imparted to the main shaft C through the gear-wheels E F G, and this, through the pitman-connections, operates the beaters $g$. At the same time the belt or chain $d$, which is driven from the main shaft C, causes the rollers or drums over which the lower apron, $a'''$, passes to rotate and carry said apron around. If, now, the grain to be thrashed is placed upon the apron $a'''$ at 2, it will be fed into the machine and carried through the same between the two aprons, and during its passage will be beaten and thrashed by the beaters $g$.

The rapidity with which the material will be carried through the machine, as also that with which the beaters operate, of course depends upon the relative sizes of the sprocket and gear wheels, and this may be varied to meet different requirements by any mechanic of ordinary skill without in any way changing the principle of operation. The straw and grain, after being thrashed, pass out from between the rollers $a\ b$ at the rear end of the machine, the grain falling into a receptacle (not shown) under the machine, and the straw being carried over or by a series of rollers, $o\ o$, (shown in dotted lines in Fig. 1,) which rollers may be driven from the main shaft by suitable belts or gearing, or an open apron may pass over the rollers $o\ o$ and be driven in the same manner as the other aprons.

It will of course be understood that suitable grain and straw conveyers may be used and connected with the machine when it is desired to convey the grain and straw away from the machine; but as these are common expedients I have not considered it necessary to show them in the drawings, as they are not necessary to the operation of the mechanism shown and described.

The upper frame, B, in Fig. 1 is broken away at the lower corners, 3 3, the better to show the spring-cushions of the rollers $b\ b$, the latter being represented in section. The lower frame, A, is also shown as broken away at 4 4, in order to better show the crank-shaft $h$, that part of the view between the points indicated being a longitudinal section.

H is a fly-wheel on the end of crank-shaft $h$, to secure steadiness of motion.

The bearings and journal-boxes of the shafts and wheels are to be made of cast-iron, lined with Babbitt metal in the usual manner.

Having thus described my invention, I claim—

1. The combination of a supporting-frame, a bed, an upper and a lower apron running over said bed, suitable driving and guiding drums or rollers therefor, one or more series of beaters hinged to the side or seats of the frame, a crank-shaft below the bed of the machine, and pitman-connections between the crank-shaft and the beaters, as and for the purpose set forth.

2. The combination of a supporting-frame, a bed, an upper and a lower apron, suitable driving and guiding drums or rollers, an auxiliary roller for guiding the upper apron, as shown, so as to form a feeding-space, and the beaters operating inside the upper apron, substantially as described.

3. In a machine of the character described, the combination of a suitable frame, a series of spring-seated rollers constituting the bed of the machine, an upper and a lower apron passing over said bed, a series of beaters hinged to the side of the frame and arranged to operate directly over or upon the bed-rollers, and suitable mechanism, substantially as described, for actuating the aprons and beaters.

ALONZO E. BRUCE.

Witnesses:
HENRY W. BOSWORTH,
CHAS. L. LONG.